US009987178B2

(12) United States Patent
Vesco

(10) Patent No.: US 9,987,178 B2
(45) Date of Patent: Jun. 5, 2018

(54) WHEELCHAIR BRAKING AND STEERING SYSTEM

(71) Applicant: Neil Vesco, San Diego, CA (US)

(72) Inventor: Neil Vesco, San Diego, CA (US)

( * ) Notice: Subject to any disclaimer, the term of this patent is extended or adjusted under 35 U.S.C. 154(b) by 92 days.

(21) Appl. No.: 14/688,896

(22) Filed: Apr. 16, 2015

(65) Prior Publication Data

US 2016/0302983 A1 Oct. 20, 2016

(51) Int. Cl.
*B62B 5/04* (2006.01)
*A61G 5/10* (2006.01)

(52) U.S. Cl.
CPC ......... *A61G 5/1024* (2013.01); *A61G 5/1008* (2013.01); *A61G 5/1035* (2013.01)

(58) Field of Classification Search
CPC .. A61G 5/1024; A61G 5/1008; A61G 5/1035; A61G 5/1018; A61G 5/1037; A61G 5/045; A61G 5/02; A61G 5/10; A61G 5/023; B60T 1/005
USPC ........................ 74/502.2, 516, 518, 532, 537
See application file for complete search history.

(56) References Cited

U.S. PATENT DOCUMENTS 4,350,227 A * 9/1982 Knoche ................ A61G 5/1018 188/2 F
5,669,619 A * 9/1997 Kim, II .................. A61G 5/045 180/6.5
5,799,756 A * 9/1998 Roberts ................... B60T 1/005 188/2 F
5,845,539 A * 12/1998 Huang ................... B62K 23/06 188/24.16
6,170,598 B1 * 1/2001 Furukawa .............. A61G 5/043 180/333
6,431,572 B1 * 8/2002 Harden ................ A61G 5/1018 180/272
6,688,571 B1 * 2/2004 Pauls ....................... A61G 5/04 248/282.1
7,252,300 B2 * 8/2007 Hargroder ................ A61G 5/10 188/24.16
2005/0023071 A1 * 2/2005 Ahnafield ............ B60W 30/18 180/333
2006/0042891 A1 * 3/2006 Larson ..................... A61G 5/02 188/109
2007/0012526 A1 * 1/2007 Holub ...................... A61G 5/10 188/2 F
2009/0295119 A1 * 12/2009 Bloswich ............... A61G 5/023 280/250.1
2014/0367207 A1 * 12/2014 Iwata .................. A61G 5/1037 188/16

FOREIGN PATENT DOCUMENTS

DE 20108006 U1 * 8/2001

* cited by examiner

*Primary Examiner* — Pamela Rodriguez
(74) *Attorney, Agent, or Firm* — The Law Offices of Eric W. Peterson

(57) ABSTRACT

A wheelchair braking system having a brake control mechanism, having a mounting member, an operation mechanism, and a link mechanism, a first braking circuit capable of applying a braking force to a first wheel, and a second braking circuit capable of applying a braking force to a second wheel.

20 Claims, 10 Drawing Sheets

WHEELCHAIR BRAKING AND STEERING SYSTEM

BACKGROUND

Wheelchairs enable users suffering from various physical and mental disabilities to engage in an increased level of activity or mobility without the constraints of pain or limitations. Wheelchairs are a convenient tool that allows mobility that would not be possible without a wheelchair.

Wheelchairs often use a variety of braking systems to slow or stop the movement of a wheelchair. A wheelchair user will typically apply friction to the tires or push-rims with either a bare or gloved hand. Many users lack the hand strength to initiate braking making it difficult or impossible to slow or stop. In addition, bare hands can be burned due to the friction created between the hand and wheel rims during braking.

Wheelchairs can provide two hand-operated brakes located in close proximity to the left wheel and the rights wheel, however, turning the wheelchair during movement of the wheelchair requires two hands which can be impractical or impossible for many.

SUMMARY OF THE INVENTION

The present disclosure pertains to a wheelchair braking system having a brake control mechanism, having a mounting member, an operation mechanism, and a link mechanism, a first braking circuit capable of applying a braking force to a first wheel, and a second braking circuit capable of applying a braking force to a second wheel.

One aspect of the disclosure is the wheelchair braking system of claim 1 where the operation mechanism has a spacing member, a support rod, and a joystick, where the spacing member engages the mounting member and the support rod, the support rod engages the joystick, and the joystick engages the link mechanism. Another aspect of the disclosure is a wheelchair braking system where the spacing member has an adjustment member.

Another aspect of the disclosure is a wheelchair braking system where the link mechanism is capable of activating the first braking circuit and the second braking circuit. Another aspect of the disclosure is a wheelchair braking system where the link mechanism is capable of deactivating the first braking circuit and the second braking circuit. Another aspect of the disclosure is a wheelchair braking system where the link mechanism is capable of activating the first braking circuit and deactivating the second braking circuit. Another aspect of the disclosure is a wheelchair braking system where activating the first braking circuit and deactivating the second braking circuit causes a wheelchair to turn in a first direction. Another aspect of the disclosure is a wheelchair braking system where the link mechanism is capable of activating the second braking circuit and deactivating the first braking circuit. Another aspect of the disclosure is a wheelchair braking system where activating the second braking circuit and deactivating the first braking circuit causes a wheelchair to turn in a second direction.

Another aspect of the disclosure is a wheelchair braking system where the link mechanism has a first link, second link, third link, fourth link, and fifth link. Another aspect of the disclosure is a wheelchair braking system where the first link is capable of receiving the joystick. Another aspect of the disclosure is a wheelchair braking system where the first link can have a link eyelet and a link bearing, where the link eyelet is capable of receiving the link bearing and the link bearing is capable of receiving the joystick. Another aspect of the disclosure is a wheelchair braking system where the first link is binary, the second link is binary, the third link is ternary, fourth link is binary, and the fifth link is ternary. Another aspect of the disclosure is a wheelchair braking system where the first link rotationally engages the second link and rotationally engages the fourth link, the second link rotationally engages the third link, the third link rotationally engages the first braking circuit and the rotationally engages the mounting member, the fourth link rotationally engages the fifth link, and the fifth link rotationally engages the second braking circuit. Another aspect of the disclosure is a wheelchair braking system where the third link has the shape of a triangle. Another aspect of the disclosure is a wheelchair braking system where the fifth link has the shape of a triangle.

Another aspect of the disclosure is a wheelchair braking system where the first braking circuit has a first master cylinder having a first piston, a first brake caliper, a first brake pad, a first rotor, and a first brake line, and the second braking circuit has a second master cylinder having a second piston, a second brake caliper, a second brake pad, a second rotor, and a second brake line. Another aspect of the disclosure is a wheelchair braking system where the first piston engages the link mechanism and the second piston engages the link mechanism. Another aspect of the disclosure is a wheelchair braking system where the link mechanism has a first link, second link, third link, fourth link, and fifth link, the first braking circuit has a first master cylinder having a first piston, a first brake caliper, a first brake pad, a first rotor, and a first brake line, and the second braking circuit has a second master cylinder having a second piston, a second brake caliper, a second brake pad, a second rotor, and a second brake line, the first piston engages the third link and the second piston engages the fifth link.

With those and other objects, advantages and features on the invention that may become hereinafter apparent, the nature of the invention may be more clearly understood by reference to the following detailed description of the invention, the appended claims, and the drawings attached hereto.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The present disclosure pertains to a braking system 10 for applying a braking force to at least one wheel of a wheelchair 1. The braking force can be applied to a first wheel 2*a*, a second wheel 2*b*, or simultaneously to the first wheel 2*a* and second wheel 2*b*. Where the braking force applies to one wheel, the wheelchair 1 turns in the direction of the wheel to which the braking force was applied. For example, without limitation, if the braking force is applied to the left wheel 2*a*, the wheelchair 1 will turn towards the left. If the braking force is applied to the right wheel 2*b*, the wheelchair 1 will turn towards the right.

Figure 1:
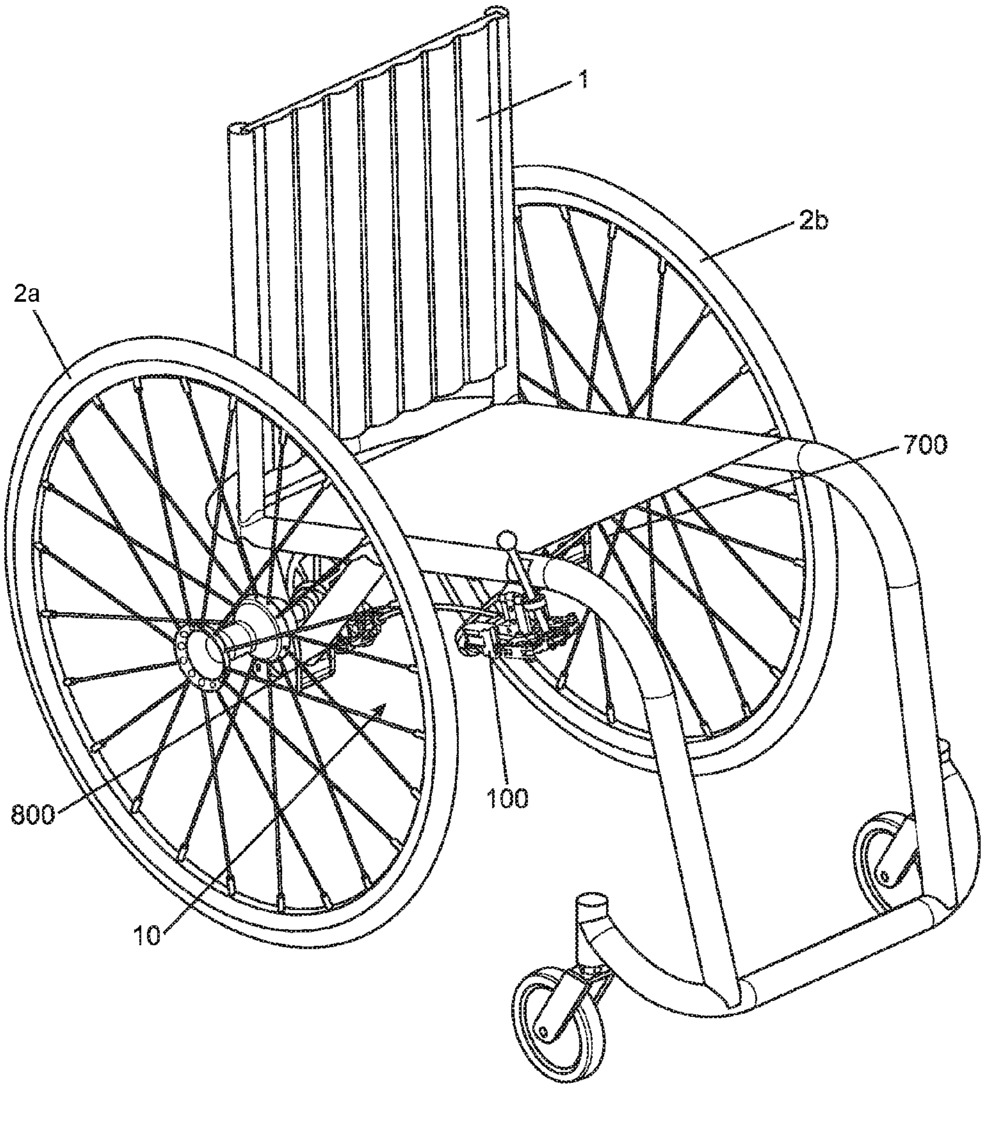
FIG. 1 is a perspective view of a braking system according to an exemplary embodiment.
Figure 2:
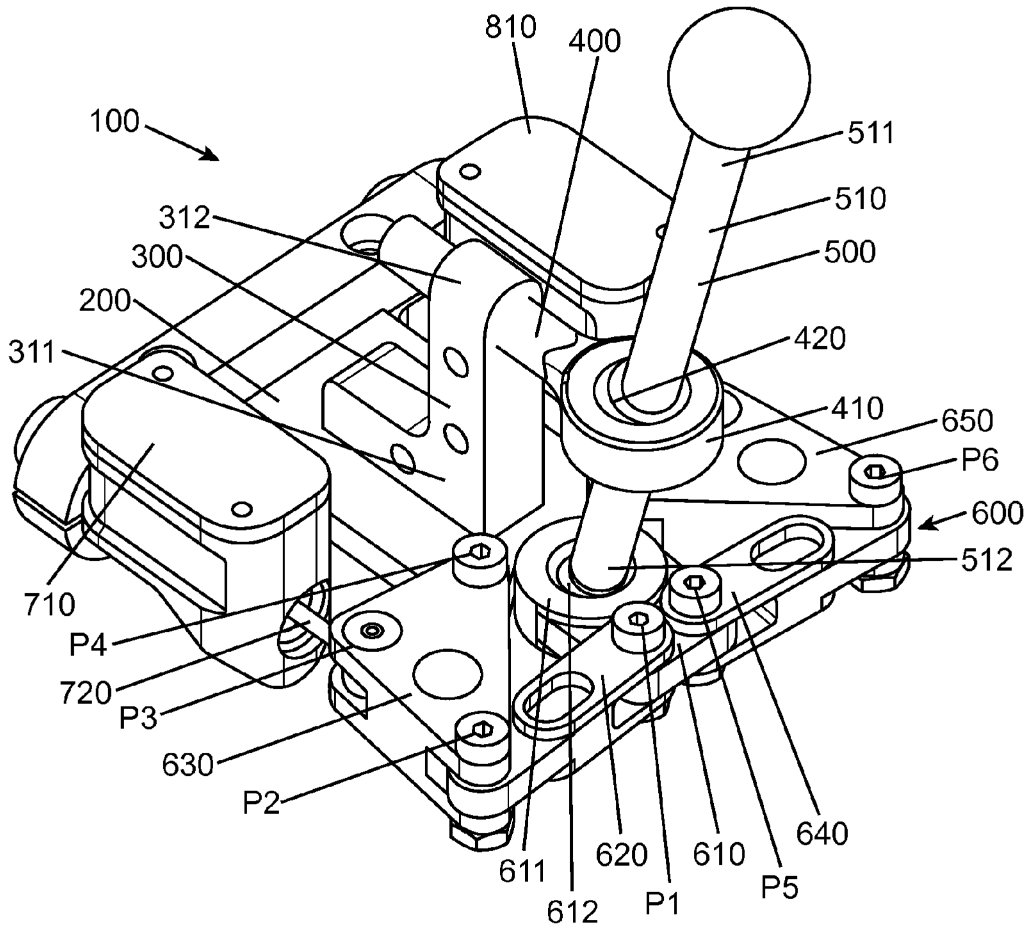
FIG. 2 is a perspective view of an operation mechanism according to an exemplary embodiment.

In one embodiment, as shown in FIG. 1, the braking system 10 can have a brake control mechanism 100, a first braking circuit 700, and second braking circuit 800. In one embodiment, as shown in FIG. 2, the brake control mechanism 100 can have a mounting member 200, an operation mechanism, and link mechanism 600.

The mounting member 200 allows for the control mechanism 100 to be mounted or attached to the wheelchair 1. The mounting member 200 can have a securing mechanism 210 engaged to one end of the mounting member 200 to allow for the control mechanism 100 to be removeably engaged to the wheelchair 1. In one embodiment, the mounting member 200 can have a cavity 220 for receiving the first link 610. In one embodiment, the perimeter of the mounting member 200 defining the cavity 220 has a shape for guiding the first link 610 towards the center of the mounting member 200. The perimeter of the mounter member 200 defining the width of the cavity 220 can have a distance that corresponds to the maximum distance the first link 610 of the link mechanism 600 can travel.

In one embodiment, the operation mechanism can drive the link mechanism 600. The operation mechanism can have an operating lever (not shown) capable of driving the link mechanism 600. In one embodiment, the operation lever slideably engages the mounting member 200 and engages the link mechanism 600. In one embodiment, the operation lever engages the first link 610. The operation lever can slide between a first and second position. The operation lever can slide to a first position thereby moving the first link 610 away from the mounting member 200 and can slide to a second position thereby moving the first link 610 toward the mounting member 200.

In one embodiment, the operation mechanism can have spacing member 300, support rod 400, and joystick 500. The spacing member 300 engages the mounting member 200 at end 311 of the spacing member 300 and the support rod 400 at the end 312 of the spacing member 300. The support rod 400 can have a rod eyelet 410 positioned at one end of the support rod 400 for receiving the shaft 510 of the joystick 500. In one embodiment, the support rod 400 can engage the spacing member 300 in a manner that allows for the support rod 400 to be substantially parallel to the link mechanism 600. In one embodiment, the spacing member 300 can be L-shaped. The spacing member 300 raises the support rod 400 to a desired height or distance above the link mechanism 600. This distance allows for the support rod 400 to rotationally or pivotally engage the joystick 500 at a location between the end 511 and end 512 of the joystick 500, so that when a force is applied in one direction to the top portion of the joystick 500, or the portion of the joystick 500 between the support rod 400 and end 511 of the joystick 500, the bottom portion of the joystick 500, or the portion of the joystick 500 between the support rod 400 and end 512 of the joystick 500, applies a force to the link mechanism 600 in the opposition direction. The spacing member 300 can be any length to allow for a desired height of the pivot position of the joystick 500. In one embodiment, the support rod 400 is positioned at the approximate center point of the length of the joystick 500. In one embodiment, the rod eyelet 410 can receive a rod bearing 420 to allow for the joystick 500 to smoothly rotate. The rod bearing 420 can have a rod aperture 430 for receiving the joystick 500.

In one embodiment, the spacing member 300 can have an adjustment member (now shown) to allow for the length of the spacing member 300, that is the distance between the end 311 and end 312, to increase or decrease. The adjustment member can be any means for increasing the length of a rod, for example, without limitation, telescoping means, or the like. In one embodiment, the adjustment member allows for an increase or decrease in sensitivity or responsiveness of the link mechanism 600 when operating or moving the joystick 500. By the adjustment member increasing or decreasing the length of the spacing member 300, the support rod 400 is positioned closer to or further from the linking mechanism 600 which in turn causes the pivot position of the joystick 500 to be closer to or further from the linking mechanism 600. Where the pivot position of the joystick 500 is closer to the linking mechanism 600, the linking mechanism 600 is more responsive to movement of the joystick 500, i.e. movement of the joystick to a desired distance causes more movement of the first link 610 than movement of the joystick 500 to the same desired distance where the joystick 500 is further from the linking mechanism 600. Where the pivot position of the joystick 500 is further from the linking mechanism 600, the linking mechanism 600 is less responsive to movement of the joystick 500, i.e. movement of the joystick 500 to a desired distance causes less movement of the first link 610 than movement of the joystick 500 to the same desired distance where the joystick 500 is closer to the linking mechanism 600.

The link mechanism 600 can have links that rotationally engage the mounting member 200, first piston 720, and second piston 820 via a series of pivot points P1 through P8. The first link 610 can rotationally engage the joystick 500. In one embodiment, the first link 610 rotationally engages end 512 of the joystick 500. The links can be arranged in a five-link configuration. This configuration includes a binary (having two pivot connections) first link 610 and four additional links that include binary links and ternary links (having three pivot connections). The first link 610 can have a link eyelet 611 for receiving a link bearing 612 to allow for the joystick 500 to smoothly rotate. The link bearing 612 can have a link aperture 613 for receiving the end 512 of the joystick 500.

Figure 3:
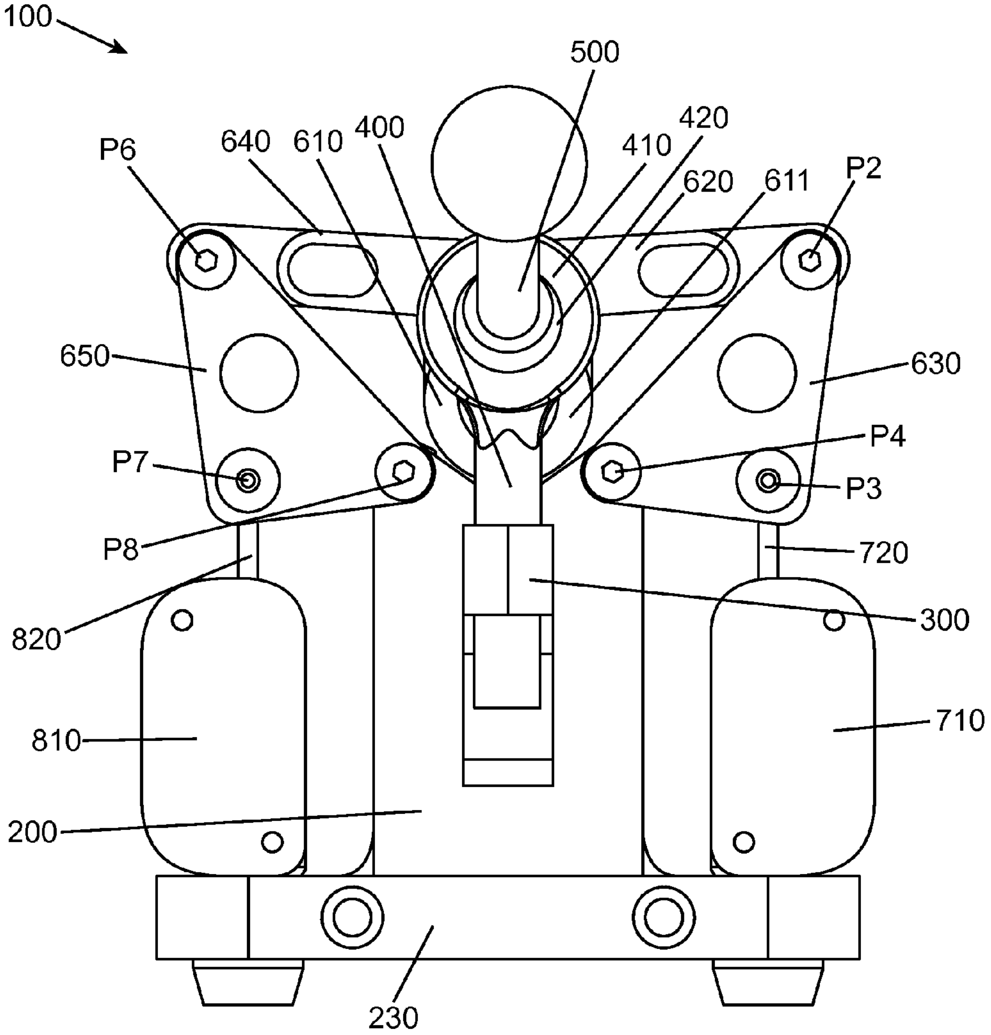
FIG. 3 is a top plan view of an operation mechanism according to an exemplary embodiment.

In an embodiment, as shown in FIG. 2-3, the link mechanism 600 can include a binary second link 620 pivotably connected to the first link 610 at a first pivot point P1, and pivotably connected to a ternary third link 630 at a second pivot point P2. The third link 630 can be pivotably connected to first piston 720 at a third pivot point P3, and can be pivotably connected to the mounting member 200 at a fourth pivot point P4. The binary fourth link 640 can be pivotably connected to the first link 610 at a fifth pivot point P5, and pivotably connected to a ternary fifth link 650 at a sixth point P6. The fifth link 650 can be pivotably connected to a second piston 820 at a seventh pivot point P7, and can be pivotably connected to the mounting member 200 at a fourth pivot point P8.

While the shape of the third link 630 and fifth link 650 can be any shape that allows for the operation of the piston, the third link 630 and fifth link 650 preferrably have the shape of a triangle. As the third link 630 rotates and translates, it translates the first piston 720. Accordingly, as the fifth link 650 rotates and translates, it translates the second piston 820.

The link mechanism 600 is capable of activating the first braking circuit 700 and the second braking circuit 800. The link mechanism 600 can move the first piston 720 and second piston 820 to and/or from a braking position. The link mechanism 600 is driven by a joystick 500. While the joystick 500 can mechanically drive the link mechanism 600, the joystick 500 can also electrically drive the link mechanism 600. For example, without limitation, the braking system 10 can have an actuator engaged to the link mechanism 600 for actuating the link mechanism 600. In one embodiment as shown in FIG. 1, the joystick 500 drives the first link 610 which in turn can directly or indirectly drive the other links in the link mechanism 600.

In one embodiment, the braking system 10 has a plurality of operation mechanisms. For example, without limitation, the braking system 10 can have a first operation mechanism with a first support rod 400 and a first joystick 500 driving a first link mechanism 600 that engages a first braking circuit 700, and a second operation mechanism with a second support rod 400 and a second joystick 500 driving a second link mechanism 600 that engages a second braking circuit 800.

Figure 4:
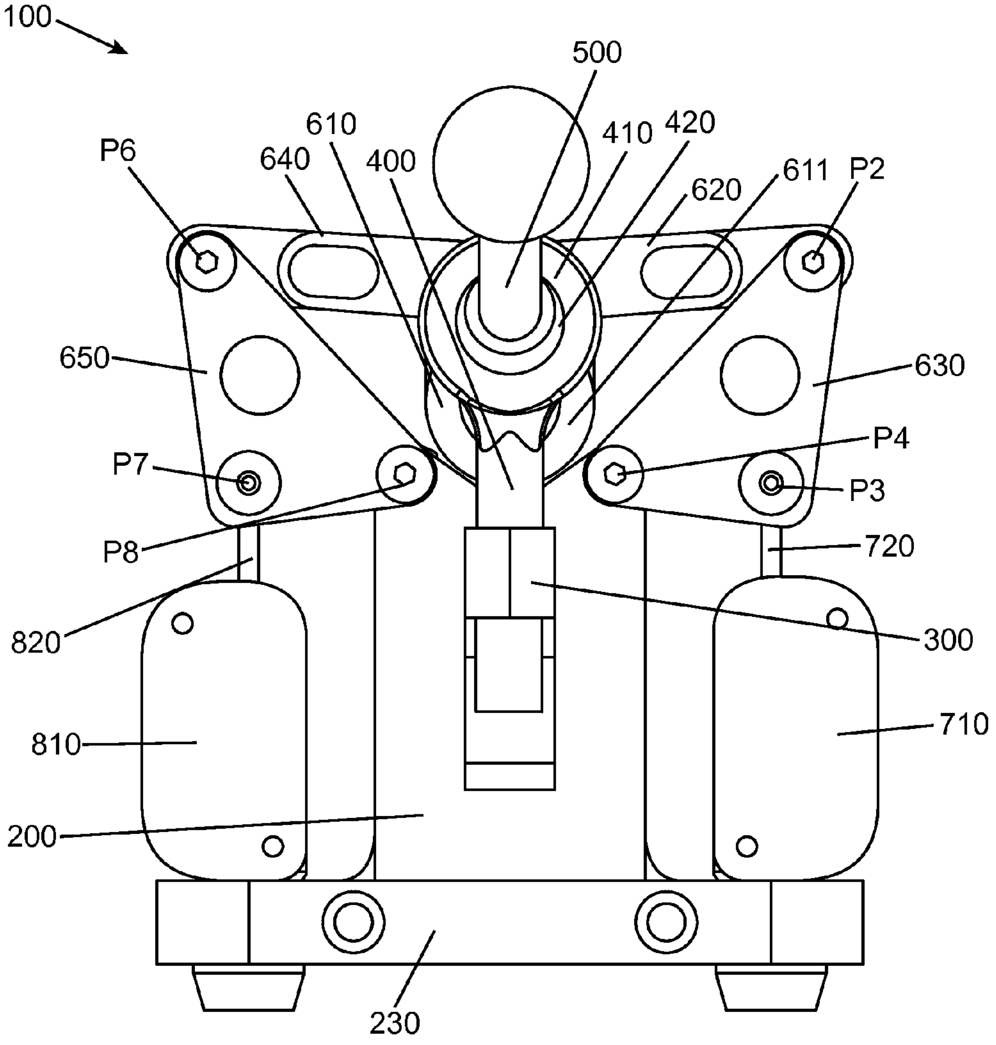
FIG. 4 is a top plan view of an operation mechanism according to an exemplary embodiment.
Figure 5:
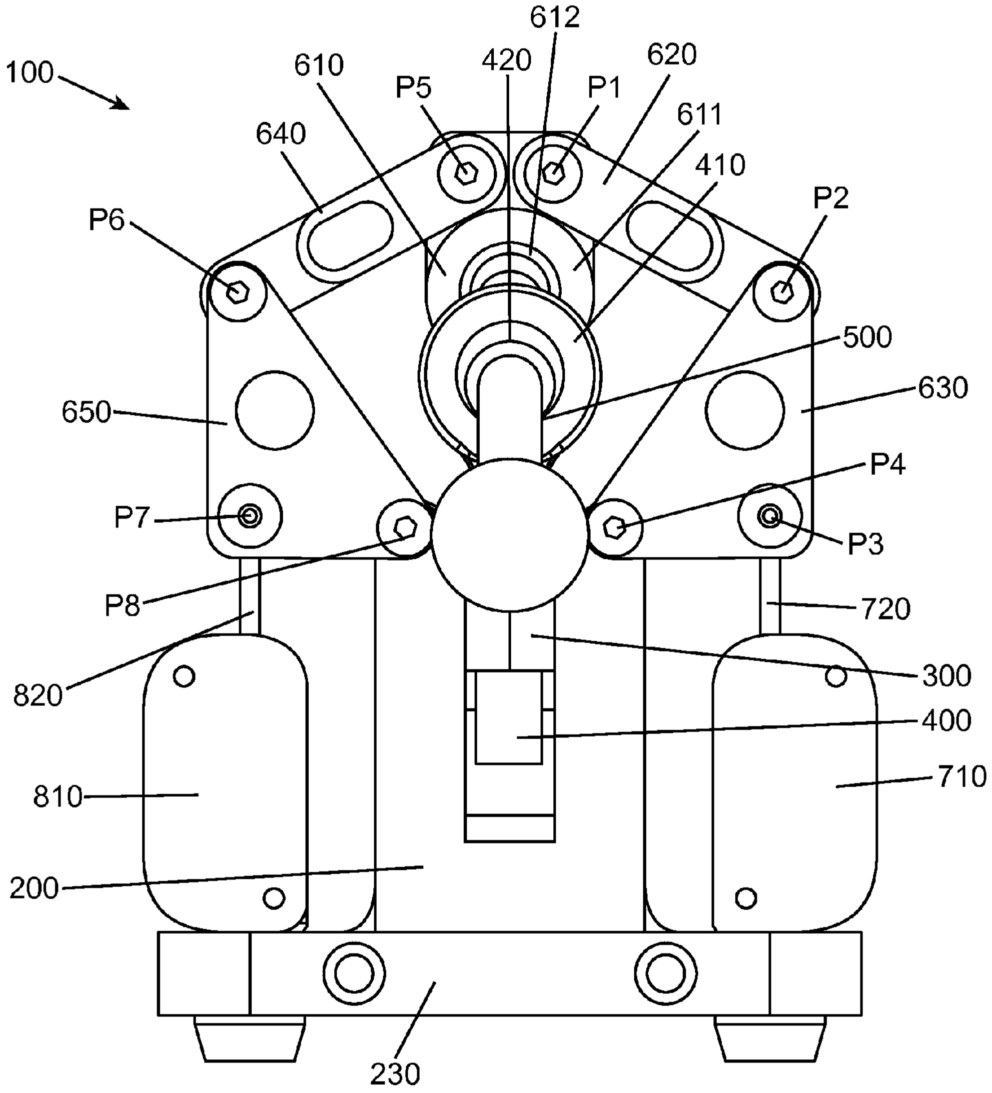
FIG. 5 is a top plan view of an operation mechanism according to an exemplary embodiment.
Figure 6:
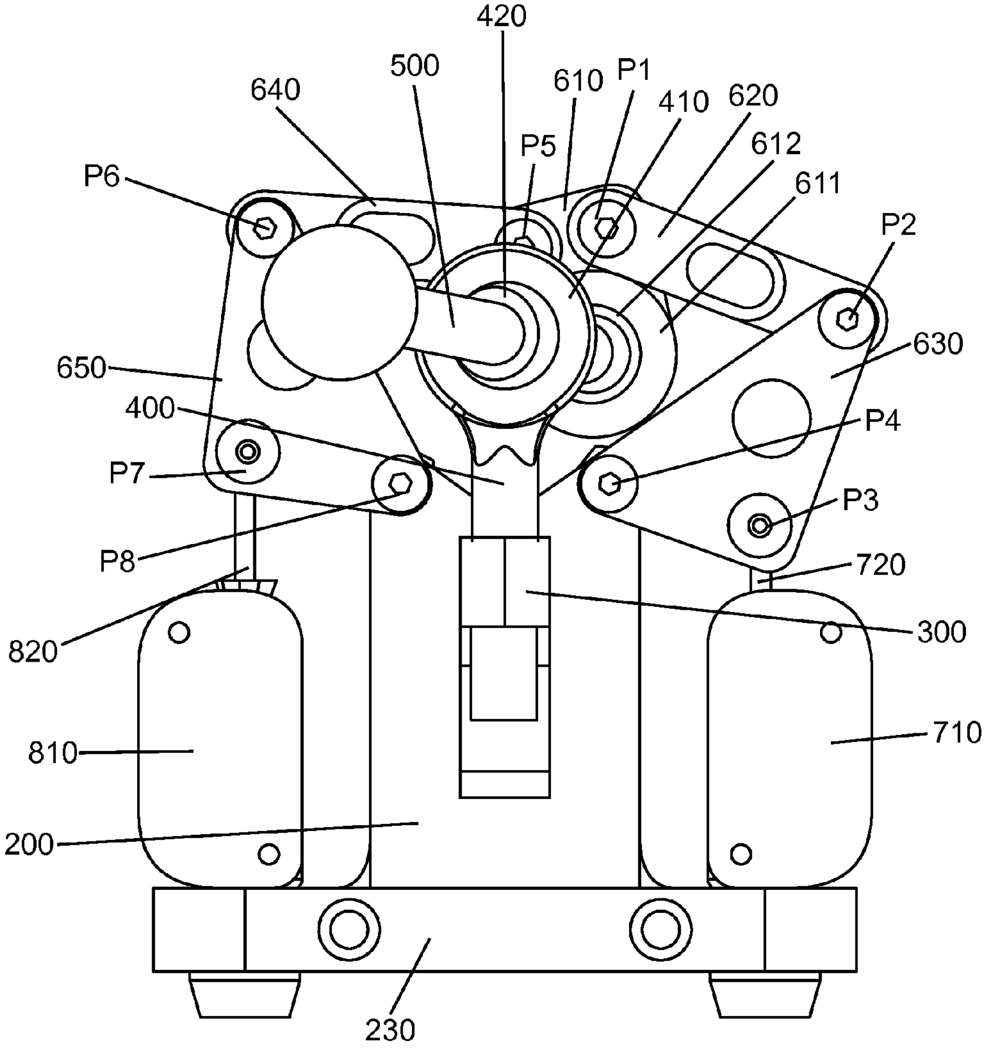
FIG. 6 is a top plan view of an operation mechanism according to an exemplary embodiment.
Figure 7:
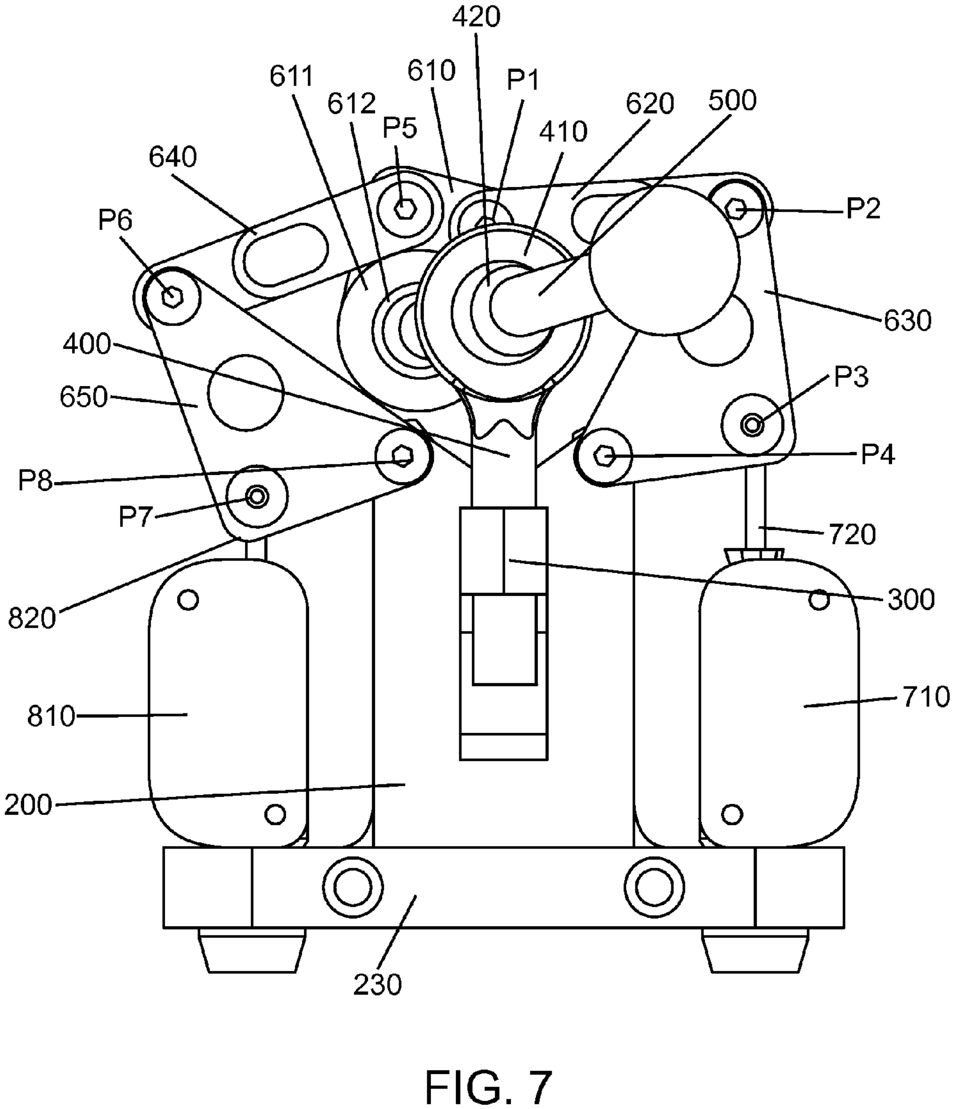
FIG. 7 is a top plan view of an operation mechanism according to an exemplary embodiment.

The link mechanism 600 has a plurality of selectable positions. For example, without limitation, in one embodiment, the link mechanism 600 position corresponds to a braking position as shown in FIG. 4, a non-braking position as shown in FIG. 5, a first turning position as shown in FIG. 6, and a second turning position as shown in FIG. 7. The link mechanism 600 can also include a plurality of intermediate positions depending on the desired level of braking, angle of turning, or the like.

FIG. 4 illustrates the braking system 10 with the first braking circuit 700 and the second braking circuit 800 activated. In this activated position, the first piston 720 and second piston 820 are in a retracted position. To achieve this position, the joystick 500 is rotated about the center point of the rod eyelet 410 in a manner that causes the end 512 of the joystick 500 to move toward the mounting member 200. This causes the link mechanism 600 to activate the first braking circuit 700 and the second braking circuit 800. Specifically, the first link 610 is pushed toward the mounting member 200 by the joystick 500, and as a result, the second link 620, third link 630, fourth link 640, and fifth link 650 move accordingly thereby pushing the first piston 720 and second piston 820 toward the first and second master cylinders 710,810, respectively.

FIG. 5 illustrates the braking system 10 with the first braking circuit 700 or the second braking circuit 800 deactivated. In this deactivated position, the first piston 720 and second piston 820 are in an extension position. To achieve this position, the joystick 500 is rotated about the center point of the rod eyelet 410 in a manner that causes the end 512 of the joystick 500 to move away from the mounting member 200. This causes the link mechanism 600 to deactivate the first braking circuit 700 and the second braking circuit 800. Specifically, the first link 610 is pulled away from the mounting member 200 by the joystick 500, and as a result, the second link 620, third link 630, fourth link 640, and fifth link 650 move accordingly thereby pulling the first piston 720 and second piston 820 away from the first and second master cylinders 710,810, respectively.

FIG. 6 illustrates the braking system 10 with the first braking circuit 700 activated. By activating the first braking circuit 700, a force is applied to a first wheel 2*a* resulting in the wheelchair 1 turning in a first direction. In this position, the first piston 720 is in a retracted position and the second piston 820 is in an extension position. To achieve this position, the joystick 500 is rotated about the center point of the rod eyelet 410 in a manner that causes the end 512 to move toward the third link 630. This causes the link mechanism 600 to activate the first braking circuit 700 and deactivate the second braking circuit 800. Specifically, the first link 610 is pushed toward the third link 630 by the joystick 500, and as a result, the second link 620, third link 630, fourth link 640, and fifth link 650 move accordingly thereby applying a force to the first piston 720 toward the first master cylinder 710 and applying a force to the second piston 820 away from the second mast cylinder 810.

FIG. 7 illustrates the braking system 10 with the second braking circuit 800 activated. By activating the second braking circuit 800, a force is applied to a second wheel 2*b* resulting in the wheelchair 1 turning in a second direction. In this position, the first piston 720 is in an extension position and the second piston 820 is in a retracted position. To achieve this position, the joystick 500 is rotated about the center point of the rod eyelet 410 in a manner that causes the rod end to move toward the fifth link 650. This causes the link mechanism 600 to activate the second braking circuit 800 and deactivate the first braking circuit 700. Specifically, the first link 610 is pushed toward the fifth link 650 by the joystick 500, and as a result, the second link 620, third link 630, fourth link 640, and fifth link 650 move accordingly thereby applying a force to the first piston 720 away from the first master cylinder 710 and applying a force to the second piston 820 toward the second master cylinder 810.

The first and second braking circuits 700, 800 can be any type of braking system 10 suitable for applying a braking force to a wheel, for example, without limitation, hydraulic braking system, electro-magnetic braking system, electro-mechanical braking system, wire braking system, or the like.

Figure 8A:
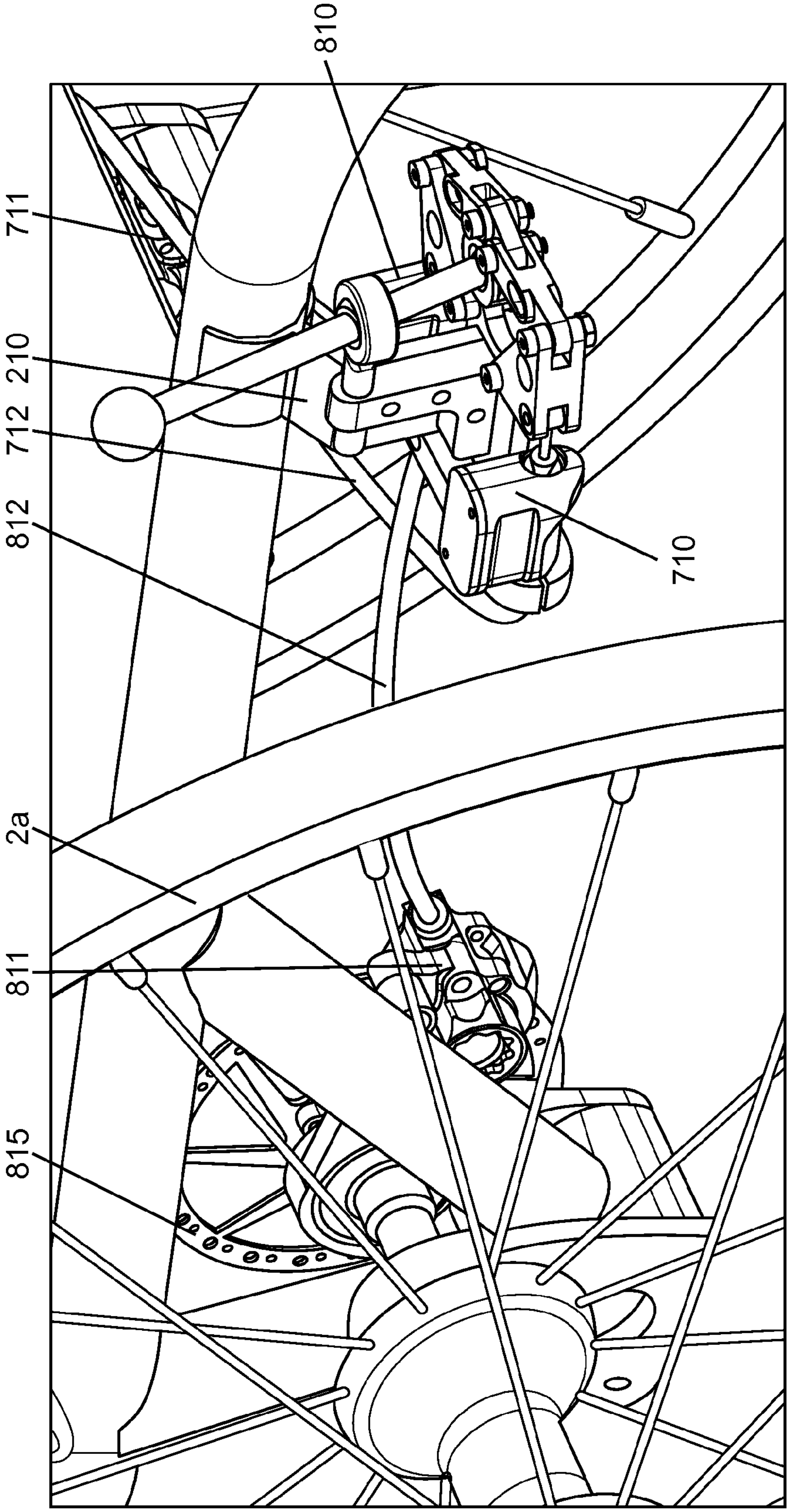
FIG. 8*a* is a perspective view of a braking circuit according to an exemplary embodiment.
Figure 8B:
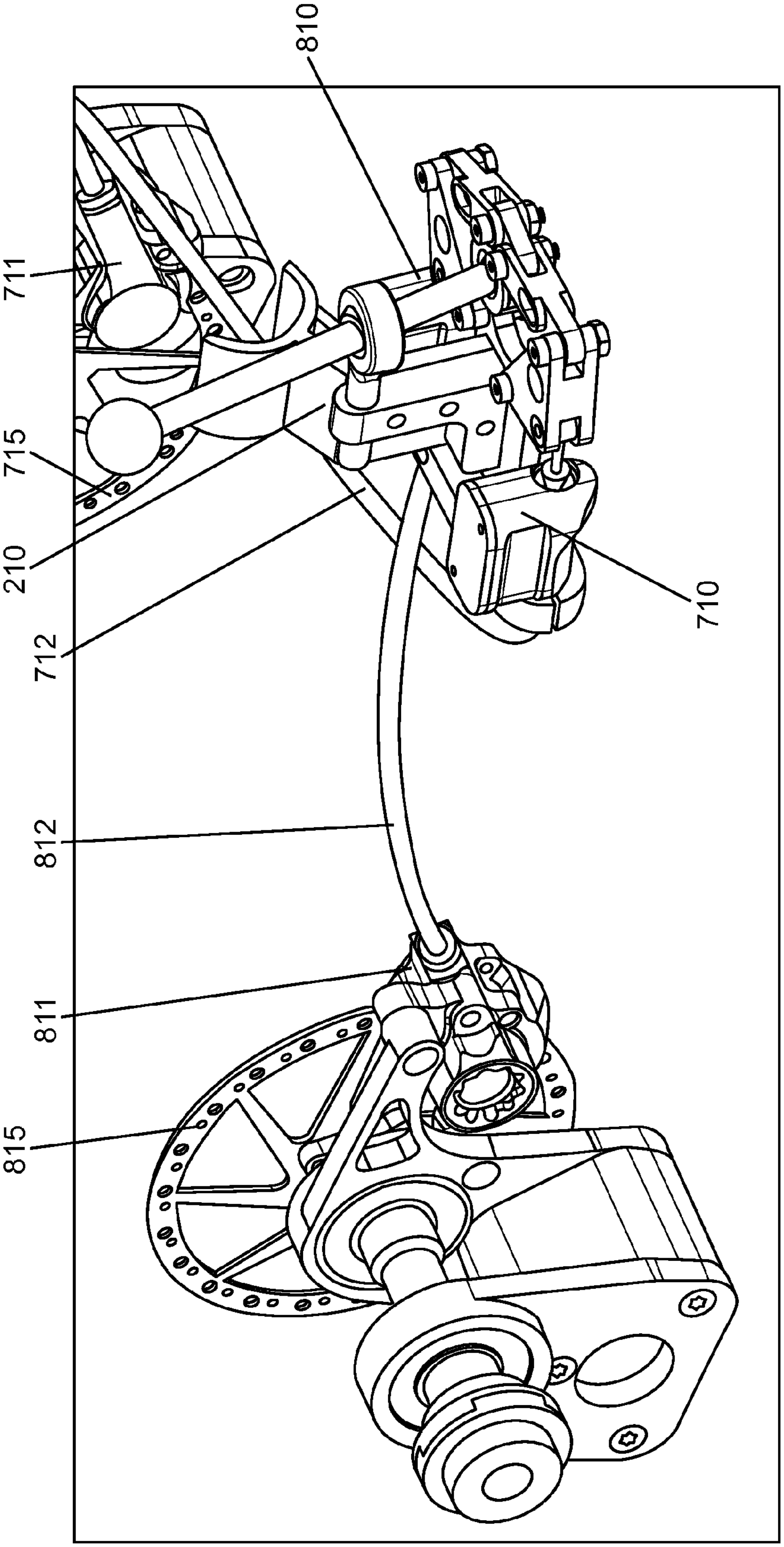
FIG. 8*b* is a perspective view of a braking circuit according to an exemplary embodiment.

As shown in FIGS. 1, 8*a*, and 8*b*, the following hydraulic braking system is used to describe the first and second braking circuits 700, 800, for exemplar purposes. The first braking circuit 700 produces a braking force via pressure transmitted to the first wheel 2*a* and the second braking circuit 800 produces a braking force via pressure transmitted to the second wheel 2*b*. To activate the first braking circuit 700, the wheelchair 1 operator rotates the joystick 500 to cause the piston to be pushed towards the first master cylinder 710 via the link mechanism 600. To activate the second braking circuit 800, the wheelchair 1 operator rotates the joystick 500 to cause the second piston 820 to be pushed towards the first master cylinder 710 via the link mechanism 600. Hydraulic pressure rises in the first and second master cylinders 710,810 and pressure is thereby transmitted to the brake calipers 711,811 through the brake lines 712,812. Brake calipers 711,811 transfer the pressure to a brake pads (not shown) thereby causing the brake pads to contact rotors 715,815 and creating friction between the rotors 715,815 and the brake pads. In one embodiment, the first and second brake lines 712,812 can engage the first caliper 711 or second caliper 811 depending on the desired wheelchair 1 movement resulting from the mechanical controls. For example, without limitation, the first brake line 712 can engage the second brake caliper 811 and the second brake 812 line can engage the first brake caliper 711, thereby causing the wheelchair 1 to turn right when the first brake circuit 700 is activated by rotating the joystick 500 toward the third link 630 or causing the wheelchair 1 to turn left when the second brake circuit 800 is activated by rotating the joystick 500 toward the fifth link 650.

The first and second master cylinders 710,810 comprise first and second pistons 720,820, a piston cup, a check valve and a return spring. First and second reservoir tanks 730,830 are located in close proximity to and communicate with the first and second master cylinders 710,810, so as to provide a supply of brake fluid. In front of the first and second pistons 720,820 can be located rubber piston cups to maintain the hydraulic pressure. In the rear of the first and second pistons 720,820 can be located piston packings to prevent the leakage of brake fluid. If pressure in the first and second master cylinders 710, 810 created by the first and second pistons, 720,820 is sufficient to activate the check valves, the check valves open and transmit pressure from the first and second master cylinders 710,810 to the first and second wheels 2*a*,2*b*.

Figure 9:
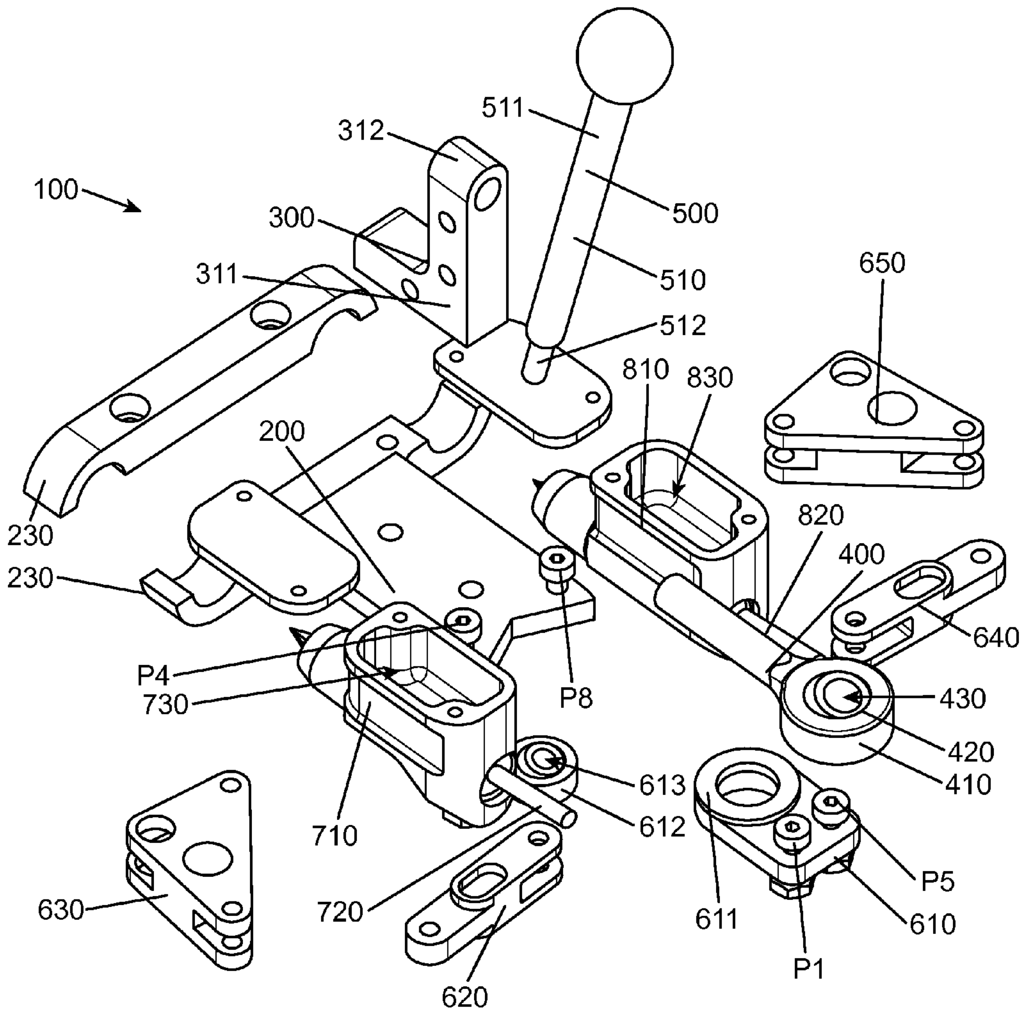
FIG. 9 is an exploded view of an operation mechanism according to an exemplary embodiment.

In one embodiment, the operation mechanism can have a stabilizing member 230 for stabilizing the first and second master cylinders 710, 810. The stabilizing member 230 can engage mounting member 200 and the first and second master cylinders 710, 810. In one embodiment, the stabilizing member 230 has a clamping mechanism as shown in FIG. 9. The stabilizing member 230 can have a top portion and a bottom portion where the top portion can be engaged to the bottom portion. The stabilizing member 230 can have a first and second hole for receiving the first and second master cylinders 710,810. In one embodiment, where the first and second holes receive the first and second master cylinders 710,810, respectively, and the top portion is engaged to the bottom portion of the stabilizing member 230, the stabilizing member 230 applies a force to the first and second master cylinders 710,810 thereby securing the stabilizing member 230 to the first and second master cylinders 710,810.

In one embodiment, where the operator rotates the joystick 500 in the direction opposite the original direction thereby, by way of the link mechanism 600, causing first and second piston 720,820 to be pulled away from the first and second master cylinders 710,810, the piston first and second 720,820 returns to is original position. In one embodiment, where the operator rotates the joystick 500 in the direction opposite the original direction thereby, by way of the link mechanism 600, releasing the force pushing the first and second piston 720,820 toward the first master cylinder 710, the piston first and second 720,820 returns to the original position by virtue of the return springs. Upon such return, where the fluid pressure in the first and second master cylinders 710,810 is sufficiently reduced, this pressure causes the check valves to close, preventing return of brake fluid to the first and second master cylinders 710,810. At the front of the piston cups, the pressure drops temporarily during return, and fluid flows into the first and second master cylinders 710,810 via a hole thereby ensuring that the return of the first and second piston 720,820 is not prevented or impaired due to low pressure in the first and second master cylinders 710,810.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. A wheelchair braking system comprising:
a brake control mechanism comprising,
  a mounting member,
  an operation mechanism comprising a joystick, and
  a link mechanism comprising a first link, wherein the first link comprises an aperture,
a first braking circuit capable of applying a braking force to a first wheel, and
a second braking circuit capable of applying a braking force to a second wheel,
wherein the aperture of the first link is configured to encompass the side of the joystick, wherein the link mechanism is capable of activating the first braking circuit and deactivating the second braking circuit, and wherein activating the first braking circuit and deactivating the second braking circuit causes a wheelchair to turn in a first direction.

2. The wheelchair braking system of claim 1 wherein the operation mechanism comprises:
a spacing member, and
a support rod,
wherein the spacing member engages the mounting member and the support rod, the support rod engages the joystick, and the joystick engages the first link.

3. The wheelchair braking system of claim 2 wherein the spacing member comprises an adjustment member.

4. The wheelchair braking system of claim 2 wherein the support rod comprises an aperture, wherein said aperture is configured to encompass the side of the joystick, wherein the support rod engages the joystick at a position between a first end of the joystick and a second end of the joystick.

5. The wheelchair braking system of claim 2 wherein the support rod comprises an eyelet, wherein the eyelet is configured to encompass the side of the joystick.

6. The wheelchair braking system of claim 5 wherein the rotational engagement of the second link with a link of the link mechanism occurs at a first pivot point, the first braking circuit at a second pivot point, and the mounting member at a third pivot point, wherein the first pivot point, second pivot point, and third pivot point are configured to rotate within one plane.

7. The wheelchair braking system of claim 1 wherein the link mechanism is capable of activating the first braking circuit and the second braking circuit.

8. The wheelchair braking system of claim 1 wherein the link mechanism is capable of deactivating the first braking circuit and the second braking circuit.

9. The wheelchair braking system of claim 1 wherein the link mechanism is capable of activating the second braking circuit and deactivating the first braking circuit.

10. The wheelchair braking system of claim 9 wherein activating the second braking circuit and deactivating the first braking circuit causes a wheelchair to turn in a second direction.

11. The wheelchair braking system of claim 1 wherein the link mechanism further comprises a second link, third link, fourth link, and fifth link.

12. The wheelchair braking system of claim 11 wherein the first link is binary, the second link is binary, the third link is ternary, fourth link is binary, and the fifth link is ternary.

13. The wheelchair braking system of claim 11 wherein the first link rotationally engages the second link and rotationally engages the fourth link, the second link rotationally engages the third link, the third link rotationally engages the first braking circuit and rotationally engages the mounting member, the fourth link rotationally engages the fifth link, and the fifth link rotationally engages the second braking circuit.

14. The wheelchair braking system of claim 11 wherein the third link comprises the shape of a triangle.

15. The wheelchair braking system of claim 11 where the fifth link comprises the shape of a triangle.

16. The wheelchair braking system of claim 1 wherein the first link comprises a link eyelet and a link bearing, wherein the link eyelet is configured to encompass the exterior side of the link bearing and the link bearing is configured to encompass the side of the joystick.

17. The wheelchair braking system of claim 1 wherein the first braking circuit comprises a first master cylinder comprising a first piston, a first brake caliper, a first brake pad, a first rotor, and a first brake line, and the second braking circuit comprises a second master cylinder comprising a second piston, a second brake caliper, a second brake pad, a second rotor, and a second brake line.

18. The wheelchair braking system of claim 17 wherein the first piston engages the link mechanism and the second piston engages the link mechanism.

19. The wheelchair braking system of claim 1 wherein the link mechanism comprises a second link, third link, fourth link, and fifth link, the first braking circuit comprises a first master cylinder comprising a first piston, a first brake caliper, a first brake pad, a first rotor, and a first brake line, and the second braking circuit comprises a second master cylinder comprising a second piston, a second brake caliper, a second brake pad, a second rotor, and a second brake line, wherein the first piston engages the third link and the second piston engages the fifth link.

20. The wheelchair braking system of claim 1 wherein the link mechanism further comprises a second link, wherein the second link rotationally engages a link of the link mechanism, rotationally engages the first braking circuit, and rotationally engages the mounting member.

* * * * *